April 12, 1966  C. B. TOLLEY  3,245,105
APPARATUS FOR CUTTING THE BODY OF A CRAB
Filed July 8, 1964  3 Sheets-Sheet 1

INVENTOR
CALVERT B. TOLLEY

BY
Scrivener, Parker, Scrivener & Clarke
ATTORNEYS

April 12, 1966 C. B. TOLLEY 3,245,105
APPARATUS FOR CUTTING THE BODY OF A CRAB
Filed July 8, 1964 3 Sheets-Sheet 2
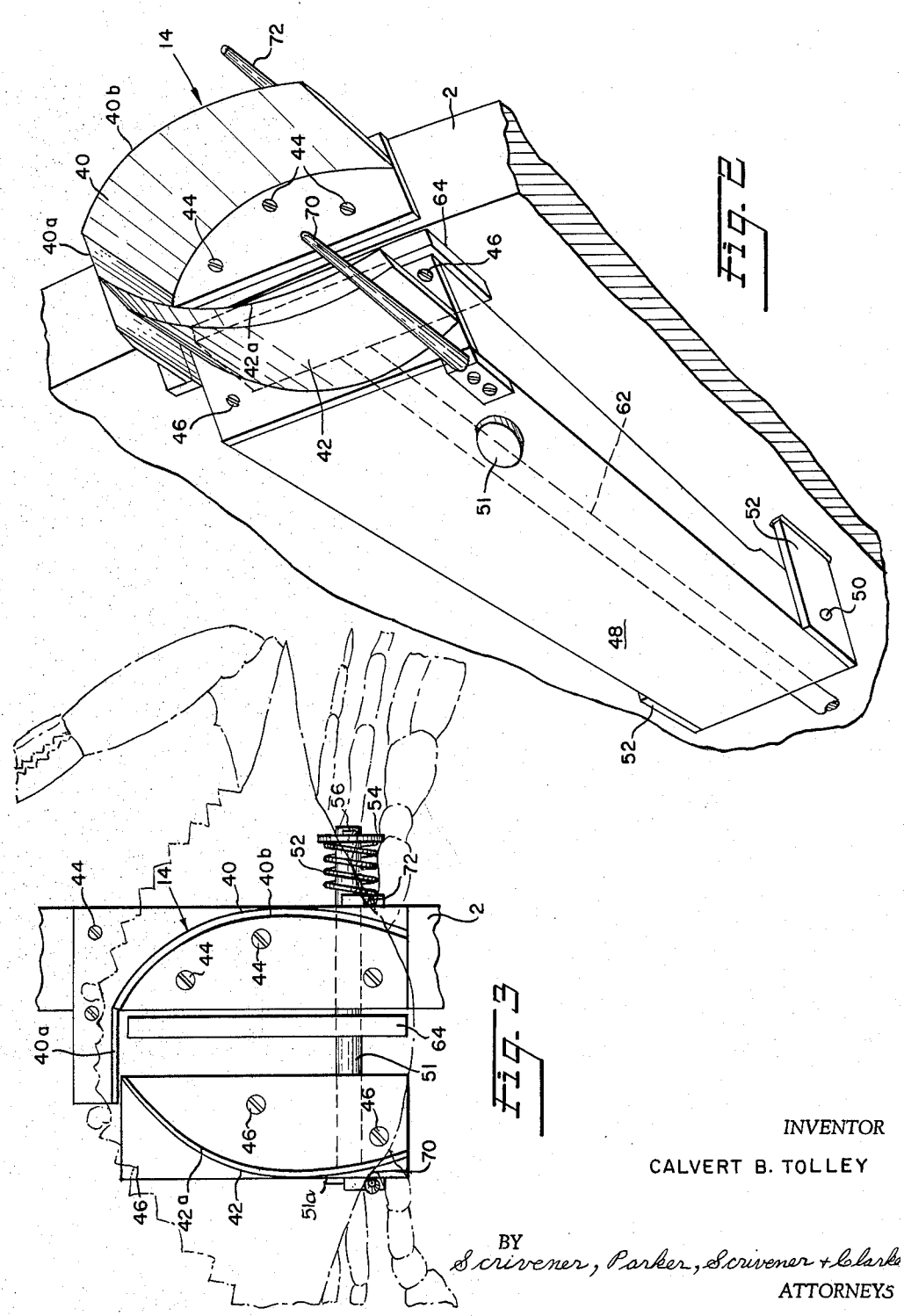
INVENTOR
CALVERT B. TOLLEY
BY
Scrivener, Parker, Scrivener + Clarke
ATTORNEYS

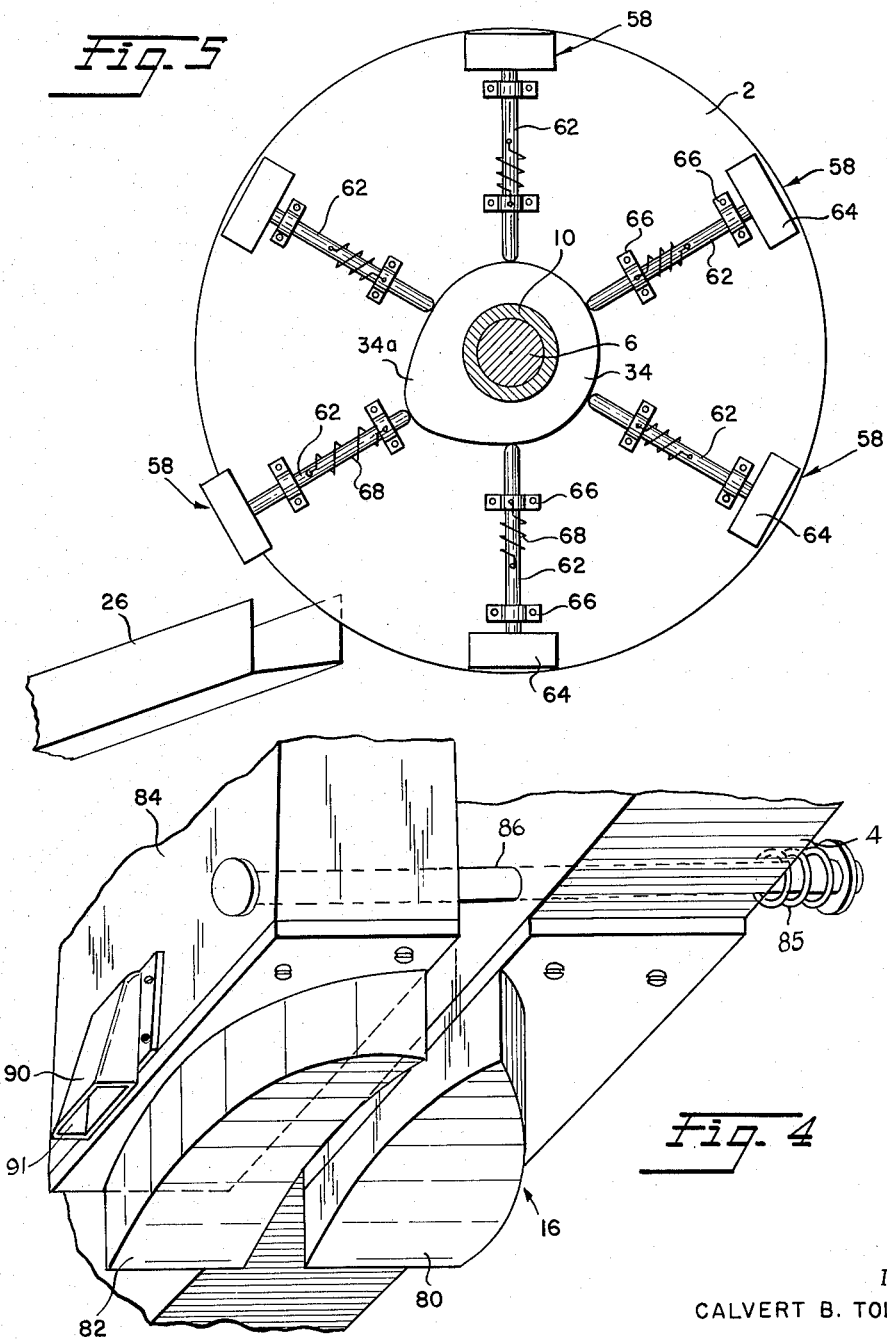

United States Patent Office 3,245,105
Patented Apr. 12, 1966

3,245,105
APPARATUS FOR CUTTING THE
BODY OF A CRAB
Calvert B. Tolley, Wingate, Md.
Filed July 8, 1964, Ser. No. 381,010
11 Claims. (Cl. 17—2)

This invention relates generally to apparatus for removing the meat-containing central core portions from crab bodies, and more particularly to coring apparatus including core severing means which are automatically adjustable to vary the size of a core in accordance with the size of the crab body from which it is severed.

In recent years, the cost of commercially obtaining crab meat from steamed crabs and the like has risen appreciably, primarily as a result of the continuously increasing labor costs incurred in operating a crab picking plant. Many automatic or semi-automatic machines have been developed for processing crabs to remove the edible crab meat from the shells. One drawback resulting from the inflexibility of the known machines is their inability to properly remove all of the choicest meat portions of the crab (specifically, the "back-fin" meat portions) without including the adjacent waste portions of the crab body. Thus, in those types of known coring machines which are operable to sever cores of constant size from crab bodies, the difficulty arises that for larger than average-sized crabs, an appreciable amount of edible crab meat is omitted from the severed core and is discarded as waste with the claws and shells. For smaller sized crabs, appreciable quantities of waste material are unavoidably included in the severed cores when they are of uniform size.

Another drawback of the known machines is the relatively slow rate of operation resulting from the difficulty in accurately orienting the crab bodies relative to the core severing means, and in properly feeding the crabs in timed relation to the operation of the severing means. Furthermore, the known crab coring machines are of relatively complicated, expensive construction and require constant maintenance and repair. The present invention was developed to avoid the above and other drawbacks of the known crab coring machines.

The primary object of the present invention is to provide an improved, positive-acting, relatively inexpensive crab coring apparatus including adjustable core severing means, and means operable upon engagement with a crab body for adjusting said severing means to produce a core having a size corresponding with that of the crab. In accordance with a specific feature of the invention, the means for adjusting said severing means is operable also to accurately mount the crab body upon said severing means in proper orientation relative thereto.

A more specific object of the invention is to provide crab core severing means comprising knife means including a plurality of relatively movable knives that continuously define a U-shaped cutting edge, and means responsive to the size of the crabs for varying the relative positions of said knives and, consequently, the size of the core producing space defined within said U-shaped cutting edge. The severing means also include anvil means adapted for insertion within the space defined by said U-shaped cutting edge during severing of a core from a crab body. In accordance with another feature of the invention, the anvil means consists of a plurality of relatively adjustable anvil sections, and means responsive to the knife adjusting means are provided for varying the effective size of the anvil means as a function of the size of the corresponding crab body.

A further object of the invention is to provide an automatic apparatus that is operable to sever from a large number of crabs in a given period of time, cores of sizes that are a direct function of the respective sizes of the crab bodies from which they are obtained. To this end, a plurality of adjustable knife means are mounted in circumferentially spaced relationship upon the outer periphery of a first rotary wheel. A plurality of corresponding anvil means are similarly mounted on a second rotary wheel coplanar and adjacent said first wheel. The elements are so arranged that when the wheels are rotatably driven at the same peripheral velocities in opposite directions, the anvil means on one wheel successively cooperate with the corresponding knife means on the other wheel. Each of the knife means includes a plurality of knives that are relatively adjustable to vary the size of each core severed thereby in accordance with the size of the corresponding crab body. In accordance with a characteristic feature of the invention, the means for adjusting the positions of said knives function also to mount and properly orient the crabs on the knife means whereby the crabs are transported by the knife means toward the cutting station (i.e., the position between the wheels where the anvil and knife means cooperate to sever the core from a crab body). Furthermore, each of the anvil means preferably consists of a plurality of sections that are relatively adjustable by the knife adjusting means to vary the effective size of the anvil means in accordance with the size of the associated crab body being severed thereby. The apparatus also includes ejector means that are automatically operable during rotation of the knife bearing wheel to eject severed cores from the knife means at a discharge station remote from the severing station. The ejected cores are deposited on conveyor means and are conveyed to a cleaning station for further processing.

Other objects and advantages of the invention will become apparent from a study of the following specification when considered in conjunction with the accompanying drawing, in which:

FIGURE 2 is a detailed perspective view of the knife means;

FIGURE 3 is a detailed end view of the knife means, the position of a crab relative thereto being shown in phantom;

FIGURE 4 is a detailed perspective view of the adjustable anvil means; and

FIGURE 5 is a detailed front elevational view, with certain parts removed, of the rotary knife wheel illustrating the operation of the crab core ejector means.

Figure 1:
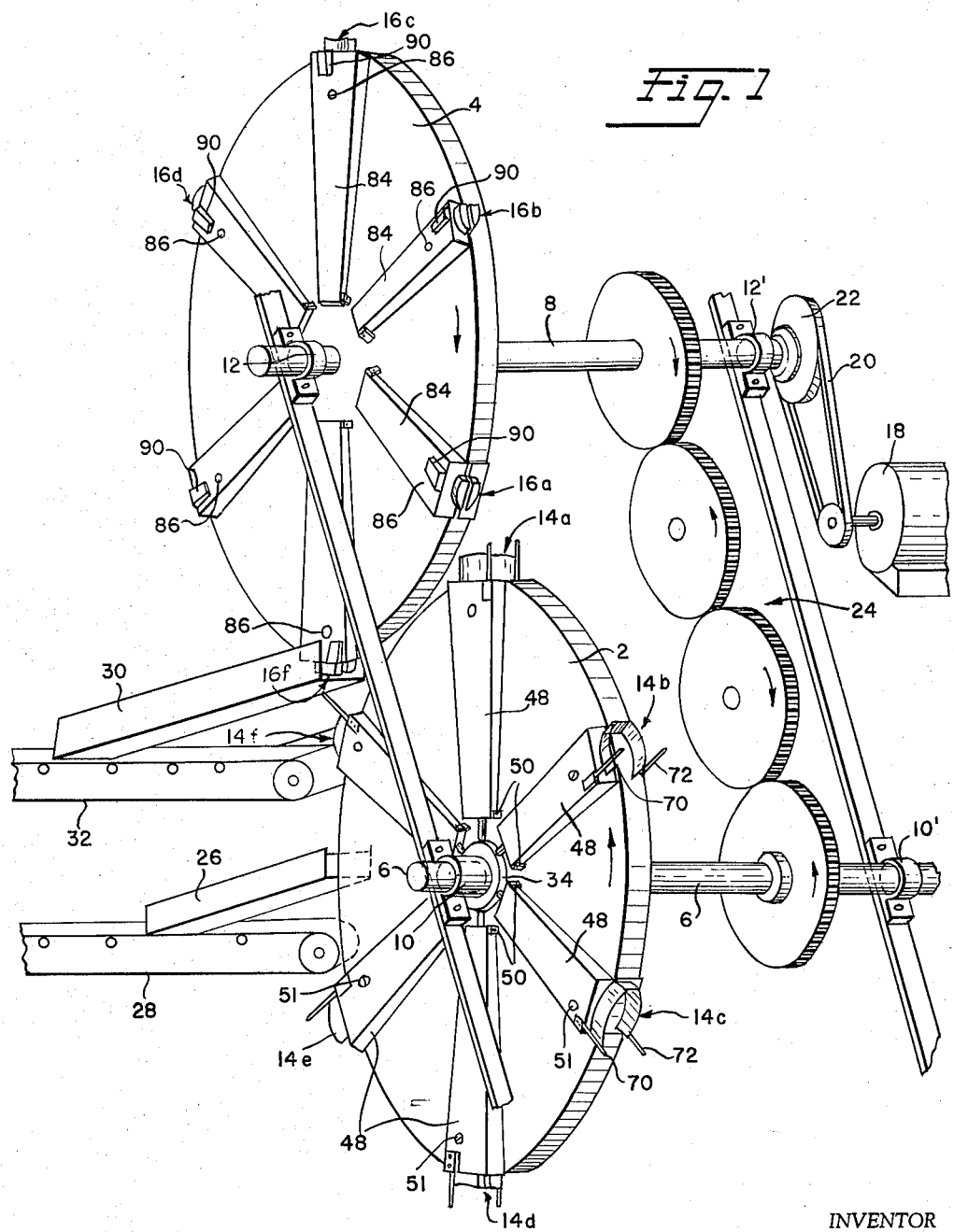
FIGURE 1 is a generally schematic perspective view of the crab coring apparatus with certain parts removed.

Referring first more particularly to FIGURE 1, the crab coring apparatus comprises a pair of coplanar rotary wheels 2 and 4 having parallel shafts 6 and 8 journalled in fixed bearings 10, 10' and 12, 12', respectively. Mounted circumferentially in spaced relationship upon the outer periphery of wheel 2 are a plurality of knife means 14a–14f. Similarly, a plurality of anvil means 16a–16f are mounted in circumferentially spaced relationship upon the outer periphery of wheel 4. These anvil means 16a–16f are arranged for successive cooperation with knife means 14a–14f, respectively, upon rotation of the wheels in the directions shown by the arrows. Wheels 2 and 4 are rotatably driven in opposite directions at the same peripheral velocity by variable speed motor 18, endless belt 20, pulley 22 secured to shaft 8, and gearing means 24 that interconnect shafts 6 and 8.

As will be described in greater detail below, the knife and anvil means cooperate to sever from crab bodies the meat-containing central core portions which are subsequently ejected onto stationary chute 26 for discharge upon endless belt conveyor 28. Intermediate the severing and core discharge stations, the waste portions of the crabs (i.e., the claws and the remaining body scrap portions) are deposited onto chute 30 for discharge upon endless conveyor belt 32. As will be described below with reference to FIGURE 5, ejector means including a stationary cam 34 secured to fixed bearing 10 are provided for ejecting upon chute 26 the severed cores contained temporarily within the spaces of the respective knife means.

Referring now to FIGURES 2 and 3, each of the knife means 14 comprises a pair of knives 40 and 42 that terminate at their free extremities in generally coplanar cutting edges. Knife 40, which is secured to the outer periphery of wheel 2 by screws 44, includes a first axially-extending edge portion 40a and a second edge portion 40b extending generally in the plane of wheel 2. Knife 42, having an edge 42a of a configuration corresponding with, and substantially the mirror image of, the edge 40b of knife 40, is secured by screws 46 to the free end of a radially-extending arm 48 that is pivotally connected with wheel 2 by pivot pin 50 and fixed spacing bracket means 52. The knife edge portions 40a, 40b and 42a are coplanar and continuously cooperate to define a generally U-shaped cutting edge corresponding with the desired outline of the core to be severed.

As shown in FIGURES 1 and 2, the pivot pins 50 lie in a plane parallel with and spaced from the adjacent face of wheel 2, said pins 50 being so arranged that the arms 48 pivot in radial planes normal to the wheel 2, respectively. Consequently, pivotal movement of a given arm causes relative lateral movement between the knives 40 and 42 associated therewith.

Brackets 52, which are secured to wheel 2, support the pivotally connected end of arm 48 in spaced relationship relative to the wheel 2. Extending through axially aligned bores in arm 48 and wheel 2 is a bolt 51 having at one end a bolt head 51a and on the other end of which is mounted a spring 52 and a spring retainer washer 54 that is maintained on the bolt 51 by a cotter pin 56. It is apparent that spring 52 continuously biases the pivotally mounted arm 48 toward the wheel 2. Reciprocably mounted in the space between each arm 48 and wheeel 2 is a radially arranged ejector means 58 that includes a rod 62 to the outermost end of which is secured an ejector bar 64. At its other end of radially extending rod 62, which is quided by guide means 66 secured to wheel 2, engages the surface of stationary cam 3 that is secured to fixed bearing 10. Spring means 68 continuously biases arm 62 radially inwardly into engagement with the surface of cam 34. Normally, the ejector bars 64 are in a retracted position relative to the knives 40 and 42 as shown in FIGURE 2. Referring to FIGURE 5, it will be seen that cam 34 has a rise portion 34a opposite the cores discharge chute 26. Thus, during rotation of the wheel 2, the ejector means are maintained in their retracted positions until the knife means associated therewith is opposite the core discharge chute 26, whereupon the rise portion 34a of cam 34 effect radial outward displacement of the corresponding ejector means to eject a severed core onto chute 26.

Referring again to FIGURES 2 and 3, a pair of radially-extending crab contacting figures or pins 70 and 72 are connected at one end with wheel 2 and arm 48, respectively, adjacent the free extremities of the U-shaped cutting edge defined by knife edges 40b, 40a and 42a. These pins are tapered, as shown in FIGURE 2, and serve the dual function of mounting a crab in proper orientation on the knife means and of varying the spacing between the knife edges 42a and 40b in accordance with the size (i.e., the width) of the body of the crab. Thus, as shown in FIGURE 3, each of the pins 70 and 72 is adapted for insertion between a back fin and the adjacent rear fin of a crab. Owing to the biasing action of spring 52 the pins are biased toward each other into engagement with the junctions between the back fins and the crab body, thereby maintaining the crab on the knife means 14. Preferably the crab is mounted with the underside portion of the crab body in engagement with the knife edges. It is apparent that for relatively large crabs, the spacing distance between the back fins is rather great, and consequently the arm 48 is pivoted outwardly against the biasing force of spring 52 to displace knife 42 away from the edge portion 40b of knife 40, thereby increasing the size of the core that is severed from the crab body. Owing to the fact that the axially extending knife edge portion 40a of knife 40 is of appreciable length, a U-shaped cutting edge is continuously defined by each of the knife means 14 for all positions of adjustment of knife 42 relative to knife 40. It should be mentioned that owing to the arrangement of the pins 70 and 72 relative to the knife edges 42a and 40b and to the engagement between these pins and the back fins of the crabs, the inclusion of the choice back fin meat portions of the crab body within the severed core is assured in a most positive manner.

Referring now to FIGURE 4, each of the anvil means 16 includes a pair of adjustable anvil sections 80 and 82 that are secured to wheel 4 and radially-arranged, pivotally mounted arms 84, respectively. As shown in FIGURE 1, arms 84 are pivotally connected with wheel 4 in a manner identical to the connections between arms 48 and wheel 2. Spring means 85 cooperate with bolts 86 to bias arms 84 toward wheel 4. Consequently, it will be seen that anvil sections 80 and 82 constitute an expansible anvil having an outer peripheral configuration corresponding with the space defined within the U-shaped cutting edge of the knife means 14.

In accordance with a further feature of the invention, the spacing of the anvil section 80 and 82, and consequently the effective size of the anvil means 16, is also adjusted in accordance with the size of the crab body. To this end, each of the arms 84 has secured to the outer surface thereof a female member 90 containing a relatively large outwardly directed recess 91 adapted to receive the tapered free extremity of a corresponding one of the mounting pins 70 during rotation of the wheels 2 and 4. Thus, the anvil means 16 are automatically controlled to have an outer peripheral configuration that corresponds with the space within the knife means. The size of each of the anvil means is so controlled that it is received within the space defined by the U-shaped knife edges during severing of a core. Preferably, the faces of anvil sections 80 and 82 are contoured in a concave manner to correspond with the upper shell surface of the crab body.

It should be noted that depending on the distance between shafts 6 and 8, the upper shell portion of the crab body may or may not be severed together with the core as desired.

*Operation*

In operation, an operator facing the apparatus of FIGURE 1 successively mounts processed (i.e., steamed) crabs—underside down—upon the foremost knife means 14 in the manner illustrated in FIGURE 3. More specifically, the crabs are so arranged that each of the pins 70 and 72 extends between the back fin and the adjacent fin, and owing to the biasing action of springs 52, the pins are urged together against the crabs just prior to mounting the crab bodies in proper orientation on the knife means. The knife edges 40a, 40b and 42a continuously define a U-shaped cutting edge containing a core-receiving space the size of which is a direct function of the size of the crab body mounted thereon.

As the crabs are successively transported on the knife means toward the severing station, the pins 70 successively engage the cups 90 associated with the corresponding anvil means 16 and adjust the sections thereof to define an anvil having an effective outer periphery corresponding with the sizes of the crabs associated therewith. The anvil and knife means cooperate to punch the appropriately sized cores into the space defined within the successive knife means, whereupon the waste portions of the crabs are deposited on chute 30 and conveyor 32.

As a given knife means 14 containing a severed core is rotated toward core discharge chute 26, the cam rise 34a effects radial outward displacement of the associated ejector means 58 as shown in FIGURE 5, whereupon the core is ejected onto discharge chute 26 and is deposited on conveyor 28 for further cleaning treatment.

Although the shafts 6 and 8 have been illustrated as being rotated by a pulley driven gear train, other drive means may be utilized equally as well. As will be obvious to those skilled in the art, other modifications may be made in the apparatus illustrated and described above without deviating from the invention set forth in the following claims.

What is claimed is:

1. Apparatus for severing a meat-containing central core portion from the body of a crab, comprising
    knife means including a pair of relatively laterally movable knives continuously defining a generally U-shaped cutting edge having a pair of leg portions and a bridging portion, one of said knives carrying one leg portion of said U-shaped cutting edge and the other of said knives carrying the bridging and other leg portions of said U-shaped cutting edge, said U-shaped cutting edge defining a core-receiving space;
    means supporting a crab body relative to said knife means, said supporting means being operatively associated with said knife means to vary the relative lateral positions of said knives with respect to the width of the crab body;
    means adapted for at least partial insertion in said core-receiving space and having, in cross-section, an effective outer peripheral configuration corresponding generally with, and of substantially the same size as that of, said core-receiving space; and
    means for moving said knife and insertion means together on opposite sides of said crab body to sever said central core portion therefrom.

2. Apparatus as defined in claim 1 wherein said insertion means includes a plurality of relatively movable anvil sections, and further including means operable by said knife adjusting means when said insertion and knife means are brought toward each other for adjusting the relative positions of said anvil sections to vary the effective size of said insertion means in accordance with the size of the space defined by said U-shaped cutting edge.

3. Apparatus for automatically removing the meat-containing central core portions from crab bodies, comprising
    a pair of adjacent, coplanar rotary wheels;
    a plurality of circumferentially-spaced knife means mounted upon the outer periphery of one of said wheels, each of said knife means including a pair of relatively laterally movable knives continuously defining a generally U-shaped cutting edge having a pair of leg portions and a bridging portion, one of said knives carrying one leg portion of said U-shaped cutting edge and the other of said knives carrying the bridging and other leg portions of said U-shaped cutting edge, said U-shaped cutting edge defining a core-receiving space.
    a plurality of circumferentially-spaced anvil means mounted upon the outer periphery of the other of said wheels for cooperation with said knife means, respectively, each of said anvil means being adapted for insertion within the space defined by the U-shaped cutting edge of the corresponding knife means;
    means associated with each of said knife means for mounting a crab upon said U-shaped cutting edge and for adjusting the relative positions of said knives and the space defined therebetween in accordance with the size of the crab body; and
    means for rotatably driving said wheels at the same peripheral velocity whereby said knife means and the corresponding anvil means cooperate to sever the cores from the crab bodies.

4. Apparatus as defined in claim 3 wherein each of said anvil means includes a plurality of relatively adjustable anvil sections, and further including means operable by the crab mounting means of the associated knife means for adjusting the relative positions of said sections to vary the effective size of said anvil means in accordance with the size of the crab body mounted on said knife means.

5. Apparatus as defined in claim 3 and further comprising ejector means including a plurality of ejector members associated with said knife means, respectively, and means for operating said ejector members to eject the severed cores from said knife means.

6. Apparatus as defined in claim 5 wherein said apparatus includes stationary discharge means adjacent said wheel carrying said knife means, and further wherein said ejector member operating means includes a stationary cam for operating the ejector member associated with that knife means which is opposite said discharge means at a given time.

7. Apparatus for automatically removing the meat-containing central core portions from crab bodies, comprising
    a pair of adjacent coplanar wheels mounted for rotation about parallel axes;
    a plurality of circumferentially-spaced knife means mounted upon the outer periphery of one of said wheels, each of said knife means comprising a pair of knives a first one of which is secured to said wheel, a radially-arranged knife-supporting arm pivotally connected at one end with a face of said wheel adjacent the axis of rotation thereof for pivotal movement in a radial plane normal to the face of said wheel, the other knife being secured to the free end of said arm adjacent said first knife, and spring means pivotally biasing said arm toward said wheel, said knife pair having edges that continuously cooperate to define a generally U-shaped cutting edge defining a core receiving space;
    a plurality of circumferentially-spaced anvil means mounted on the outer periphery of the other of said wheels for cooperation with said knife means, respectively, each of said anvil means being adapted for insertion within the space defined by the U-shaped cutting edge of the corresponding knife means;
    means associated with each of said knife means for mounting a crab upon said cutting edge and for adjusting the relative lateral positions of said knives and the space defined therebetween in accordance with the size of the crab body, said mounting means comprising a pair of radial pins secured to said arm and said wheel adjacent said knife pair, respectively, and extending radially outwardly beyond said cutting edge, each of said pins being adapted for insertion between one back fin and the next adjacent fin of a crab; and
    means for rotatably driving said wheels at the same peripheral velocity whereby said knife means and the corresponding anvil means cooperate to sever the cores from the crab bodies.

8. Apparatus as defined in claim 7 wherein said U-shaped cutting edge has a pair of leg portions and a bridging portion, said first knife having a generally L-shaped cutting edge defining said bridging and one of said leg portions, and said other knife having a cutting edge defining the other of said leg portions.

9. Apparatus as defined in claim 8 wherein said mounting pins are arranged externally of and adjacent the free extremities of the legs of said U-shaped cutting edge.

10. Apparatus as defined in claim 9 wherein each of said anvil means comprises a pair of anvil sections, a first one of which is secured to said other wheel, and a radially-arranged anvil arm pivotally connected at its inner end with said other wheel for movement in a radial plane normal to the face of said other wheel, the other one of said anvil sections being secured to the free end of said anvil arm adjacent said first anvil section, and spring means pivotally biasing said anvil arm toward said other wheel; and means on said anvil arm arranged for actuation by the mounting pin on the corresponding knife arm for pivoting said anvil arm relative to said other wheel to cause the effective size of said anvil means to correspond with the size of the space defined by said cutting edge.

11. Apparatus as defined in claim 8, and further including ejector means associated with said knife wheel for successively ejecting from the respective knife means the cores formed therein.

References Cited by the Examiner
UNITED STATES PATENTS

| | | | |
|---|---|---|---|
| 2,264,134 | 11/1941 | Hawley | 83—345 |
| 2,771,631 | 11/1956 | Hiller | 17—2 |
| 3,143,022 | 8/1964 | Andersen | 83—345 X |
| 3,151,351 | 10/1964 | Reinke | 17—2 |

SAMUEL KOREN, *Primary Examiner.*

LUCIE H. LAUDENSLAGER, *Examiner.*